(12) United States Patent
Miao et al.

(10) Patent No.: US 7,083,335 B2
(45) Date of Patent: Aug. 1, 2006

(54) STRENGTH ADDED EPOXY FIBER BONDING IN NON-HERMETIC FIBER OPTIC PACKAGING

(75) Inventors: Rongsheng Miao, Temple City, CA (US); Leo Kha, Diamond Bar, CA (US)

(73) Assignee: Emcore Corporation, Somerset, NJ (US)

( * ) Notice: Subject to any disclaimer, the term of this patent is extended or adjusted under 35 U.S.C. 154(b) by 132 days.

(21) Appl. No.: 10/662,595

(22) Filed: Sep. 15, 2003

(65) Prior Publication Data

US 2005/0058409 A1   Mar. 17, 2005

(51) Int. Cl.
*G02B 6/36* (2006.01)
*G02B 6/00* (2006.01)
(52) U.S. Cl. .................... 385/92; 385/14; 385/88; 385/136
(58) Field of Classification Search ............ 385/88–94, 385/147, 14, 134, 136; 427/162
See application file for complete search history.

(56) References Cited

U.S. PATENT DOCUMENTS

| 5,277,930 A * | 1/1994 | Uchida ................. 427/162 |
| 5,812,720 A * | 9/1998 | Dannoux ............... 385/115 |
| 5,881,198 A | 3/1999 | Haake |
| 6,220,764 B1 | 4/2001 | Kato et al. |
| 2004/0042754 A1 * | 3/2004 | Arima et al. ............ 385/135 |

* cited by examiner

*Primary Examiner*—Frank G. Font
*Assistant Examiner*—Michael P. Mooney
(74) *Attorney, Agent, or Firm*—Christie, Parker & Hale, LLP.

(57) ABSTRACT

An optical fiber bonding scheme provides improved bonding properties and improved lifetime for non-hermetic fiber optic packages such as OSAs. The bonding scheme includes an optical fiber bonded to a substrate surface with an epoxy and a diffusion retarding plate covering the epoxy. The diffusion retarding plate prevents moisture absorption by the top surface of the epoxy and the large footprint of the epoxy provides a long diffusion path which produces a lower water concentration gradient within the epoxy, restricts lateral diffusion of absorbed water molecules within the epoxy, and produces an extremely saturation resistant epoxy. The diffusion retarding plate may further include legs that bound opposed sides of the epoxy providing further saturation resistance.

22 Claims, 2 Drawing Sheets

STRENGTH ADDED EPOXY FIBER BONDING IN NON-HERMETIC FIBER OPTIC PACKAGING

BACKGROUND OF THE INVENTION

Optoelectronic devices and systems are widely used in today's telecommunications and other industries. In optoelectronic systems, an electrical signal is converted to an optical signal that travels along an optical transmission medium such as an optical fiber, and is then typically converted back to an electrical signal. A high optical coupling efficiency between the optical transmission medium that carries the optical signal, and the device that converts the optical signal to an electrical signal (or vice versa), is required for good optoelectronic connections and system functionality. The precise placement and accurate alignment of the optical fiber, with respect to other optoelectronic components, is required for a high optical coupling efficiency. The electrical-to-optical and optical-to-electrical optoelectronic connections are typically made in optical subassemblies (OSAs) such as TOSAs (transmission OSAs) and ROSAs (receiving OSAs) or other optical packages. Optical fibers are typically held in place within such an OSA or optical package, by being joined to a fixed member such as a substrate, using an epoxy.

Non-hermetic optoelectronic packages include the shortcoming that epoxy fiber bonding is relatively weak due to moisture absorption by the epoxy. This absorption of moisture from the environment causes saturation and deformation of the cured epoxy and causes the position of the optical fiber to shift as the optical fiber becomes displaced or detached. With the accuracy of the optical fiber placement so critical in maintaining high optical coupling efficiency, a shift in the position of the optical fiber results in partial or full misalignment between the optical fiber and the device to which it is desirably coupled. This results in poor optical coupling and/or device failure.

Known approaches for addressing this problem in non-hermetic packaging include the use of an epoxy which has lower moisture absorption characteristics and stronger bonding capabilities in moisture, and the use of solder in place of epoxy. Each of these approaches includes shortcomings. Epoxies with low moisture absorption and stronger bonding capabilities may increase package life, but only for a limited time because all epoxies are somewhat porous and absorb moisture to some degree. Eventually, the absorbed moisture diffuses throughout the epoxies which become saturated and fail. For example, conventional packages made using such epoxies cannot survive 85/85 damp heat testing for over 800 hours. The second approach of soldering an optical fiber to a substrate is limited by the spacing within the package. Furthermore, the procedure used to solder the optical fiber may render many packages unsuitable for fiber soldering. Moreover, even in packages where fiber soldering is an option, the fiber soldering causes flux cleaning and thermal strain and stress issues which are potential factors for package failure.

It would therefore be desirable to provide a scheme for bonding optical fibers to a fixed member, such as a substrate, in a non-hermetic package such that the optical fiber remains precisely and accurately aligned. The present invention addresses these needs.

SUMMARY OF THE INVENTION

The present invention provides a strength-added epoxy optical fiber bonding scheme in non-hermetic packaging that reduces failure due to the saturation of the epoxy.

In one embodiment, the invention provides a fiber optic package comprising an optical fiber bonded to a substrate surface by an epoxy that is covered by a diffusion retarding plate. The diffusion retarding plate is formed of a moisture-resistant material.

In another exemplary embodiment, the present invention provides an optical subassembly comprising an epoxy formed over a substrate surface, a diffusion retarding plate formed over the epoxy and an optical fiber disposed between the diffusion retarding plate and the substrate surface.

In still another exemplary embodiment, the present invention provides a non-hermetic fiber optic package comprising an optical fiber joined to a substrate surface by an epoxy that is at least partially separated from the environment by a moisture-resistant member.

In yet another exemplary embodiment, the present invention provides a method for forming a non-hermetic fiber optic package. The method comprises providing an optical subassembly including a substrate and an optical fiber, and joining the optical fiber to the substrate with an epoxy. The method further provides covering the epoxy with a diffusion retarding plate that is formed of a moisture-resistant material.

BRIEF DESCRIPTION OF THE DRAWINGS

The present invention is best understood from the following detailed description, when read in conjunction with the accompanying drawings. It is emphasized that, according to common practice, the various features of the drawings are not necessarily to scale. On the contrary, the dimensions of the various features are arbitrarily expanded or reduced for clarity and to emphasize features of the present invention. Like numerals refer to like figures throughout the specification and drawings. Included are the following figures.

DETAILED DESCRIPTION OF THE INVENTION

The present invention provides a non-hermetic fiber optic package, in which an optical fiber is joined to a fixed member, such as a substrate, using an epoxy, in a manner that minimizes the amount of moisture absorbed by the epoxy and prevents or forestalls the epoxy from becoming saturated due to the diffusion of absorbed water within the epoxy. The package may include a transmission optical subassembly or a receiving optical subassembly. The optical fiber is bonded to the fixed member using an epoxy that includes a large footprint. Various suitable epoxies may be used including non-conductive epoxies and epoxies which have low moisture absorption characteristics The epoxy is covered by a diffusion retarding plate that at least partially separates the epoxy from the environment, e.g., air, that includes water vapor therein. The diffusion retarding plate thereby prevents water vapor absorption in the epoxy from above and restricts water vapor absorption to the sidewalls of the epoxy. Because of the large footprint, the lateral diffusion path for absorbed water molecules is lengthened, thereby rendering the epoxy extremely resistant to saturation resulting from the diffusion of absorbed water.

Figure 1:
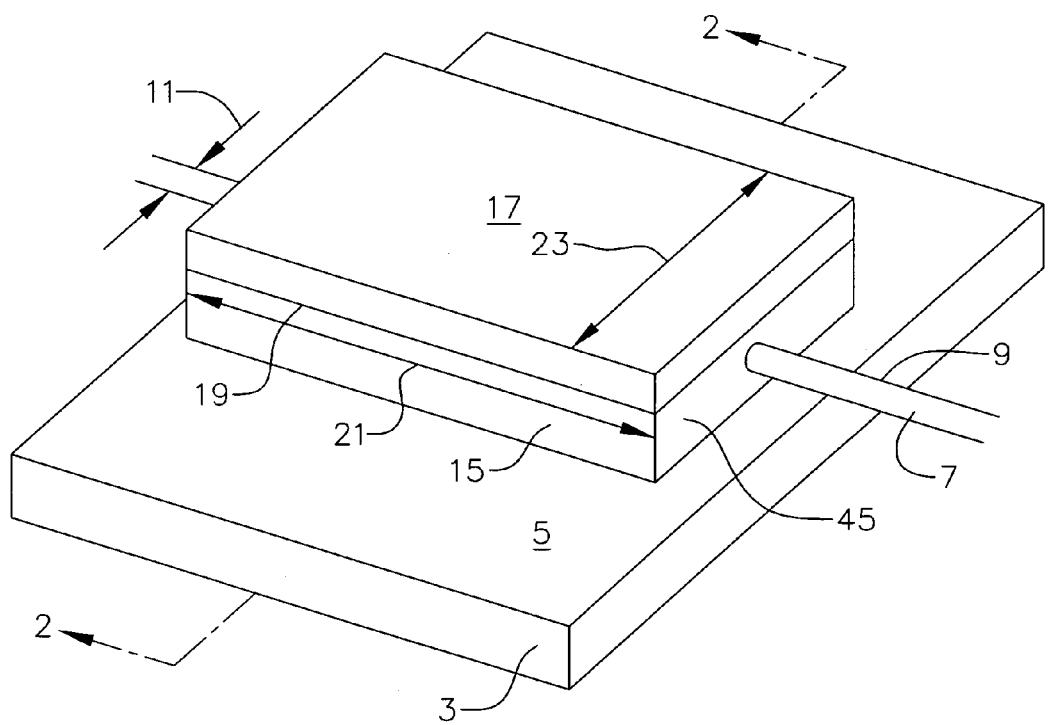
FIG. 1 is a perspective view of an exemplary embodiment of the present invention.

Now turning to the figures, FIG. 1 is a perspective view of an optical fiber joined to a fixed member in a non-hermetic package such as an OSA or other fiber optic package. In an exemplary embodiment, the package may be a butterfly package. In the illustrated embodiment, optical fiber 7 is bonded to substrate surface 5 of substrate 3. More particularly, optical fiber 7 is bonded to substrate surface 5 by epoxy 15, which is directly covered by diffusion retarding plate 17. The lower surface of diffusion retarding plate 17 forms a conterminous boundary 19 with an upper surface of epoxy 15. Optical fiber 7 may be any of various optical fibers, such as a single mode or a multi-mode fiber. In one exemplary embodiment, optical fiber 7 may be a PM (polarization maintaining) fiber. Optical fiber 7 may include various cores and jackets, and may include a cladding layer or layers according to various exemplary embodiments. Optical fiber 7 includes fiber surface 9 and diameter 11. In one exemplary embodiment, diameter 11 may be 125 microns, but other optical fiber diameters may be used in other exemplary embodiments. Although not shown in FIG. 1, either or both of the opposed ends of optical fiber 7 may be precisely aligned and optically coupled to an optoelectronic device that converts the light signal propagating through optical fiber 7, to an electrical signal, or vice versa.

Figure 2:
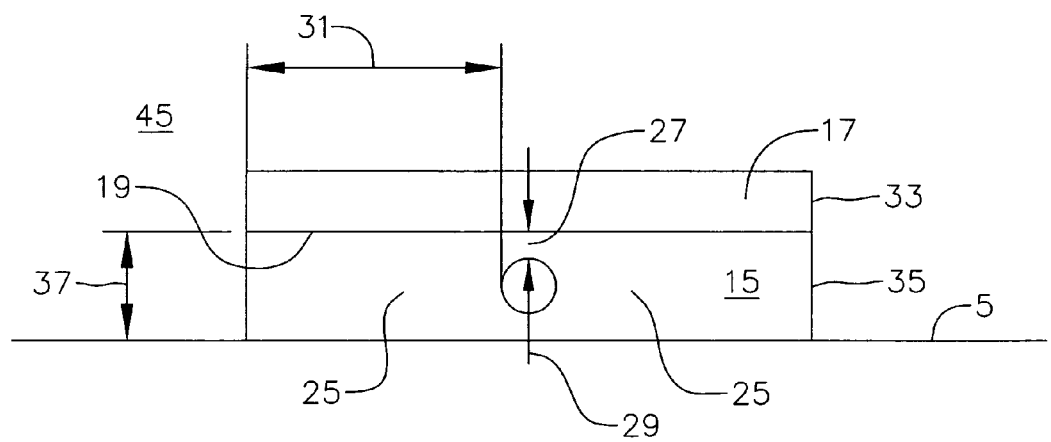
FIG. 2 is a cross-sectional view taken along line 2—2 of the exemplary embodiment shown in FIG. 1.
Figure 3:
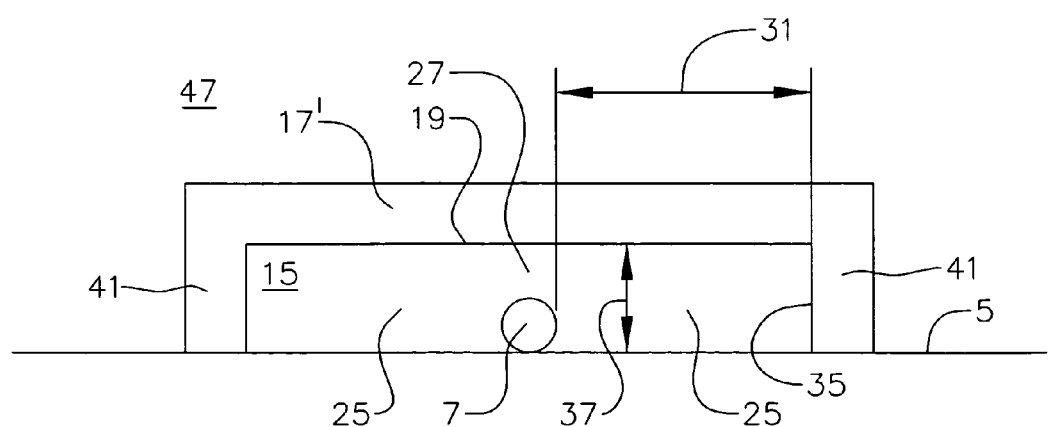
FIG. 3 is a cross-sectional view of another exemplary embodiment of the present invention.

Referring to both FIGS. 1 and 2, diffusion retarding plate 17 is formed of a moisture-resistant material such as ceramic or metal. Other moisture-resistant materials may be used in other exemplary embodiments and diffusion retarding plate 17 may be considered a cover. In the embodiment illustrated in FIGS. 1 and 2, diffusion retarding plate 17 is substantially flat and disposed substantially parallel to substrate surface 5. In this exemplary arrangement, diffusion retarding plate 17 includes a substantially planar lower surface that forms a conterminous boundary 19 with a planar upper surface of epoxy 15. This arrangement is intended to be exemplary only and other configurations may be used in other exemplary embodiments. In the illustrated embodiment of FIGS. 1 and 2, a circumferential length of optical fiber 7 is surrounded by epoxy 15 whereas, in another exemplary embodiment such as shown in FIG. 3, optical fiber 7 is disposed on substrate surface 5 and substantially surrounded by epoxy 15 except for the portion of fiber surface 9 that contacts substrate surface 5.

The size of diffusion retarding plate 17 will vary based on application and according to size restrictions in forming the OSA/optical package, e.g., the proximity of other components (not shown) of the OSA/optical package. Length 21 may range from 1 to 5 millimeters in an exemplary embodiment but will vary depending on the space available in the package. Width 23 will also vary depending on the space available and it is advantageous to choose width 23 and length 21 to produce a large footprint, that is, the area covered by diffusion retarding plate 17 which is a product of length 21 times width 23. Diffusion retarding plate 17 prevents moisture absorption and the large footprint retards diffusion of the absorbed water within epoxy 15. The relatively straight and smooth combined sidewall 33 of diffusion retarding plate 17 and sidewall 35 of epoxy 15 as shown in FIG. 2, is intended to be exemplary only. In other exemplary embodiments, diffusion retarding plate 17 may slightly overhang epoxy 15 or epoxy 15 may encroach past sidewalls 33 of diffusion retarding plate 17. Sidewalls 33 are also not limited to the straight vertical configuration shown in the exemplary embodiment of FIGS. 1 and 2.

The method for forming the illustrated arrangement includes providing a substrate surface 5 then fixing optical fiber 7 in desired position over or on substrate surface 5. This may be accomplished by first aligning optical fiber 7 and placing optical fiber 7 in a desired position over or on substrate surface 5, then initially fixing optical fiber 7 in position using a minimal amount of UV epoxy and a subsequent light curing process. In another exemplary embodiment, a minimal amount of thermal epoxy and a subsequent heating process may be used. After optical fiber 7 is initially fixed in position, a larger amount of thermal epoxy is introduced to the arrangement and diffusion retarding plate 17 is then placed into position. As such, epoxy 15 consists primarily of the larger amount of thermal epoxy and may be alternatively referred to as thermal epoxy 15. Various suitable thermal epoxies are commercially available and may be used, including non-conductive epoxies and epoxies which have low moisture absorption characteristics Thermal epoxy 15 is then cured by a subsequent heating process. Various mechanical means may be used to position diffusion retarding plate 17 over the epoxy 15/optical fiber 7 arrangement. In an exemplary embodiment, spacers may be used to ascertain that diffusion retarding plate 17 is spaced from substrate surface 5 by the appropriate spacing 37. Various other means may be used to position diffusion retarding plate 17 into its desired position by contacting diffusion retarding plate 17 to epoxy 15 such that epoxy 15 is displaced and conforms to the shape of diffusion retarding plate 17 which contacts the epoxy.

Referring to FIG. 2, epoxy 15 includes top portion 27 and lateral or adjacent portions 25. Top portion 27 includes a thickness 29 which may range from 0.5 to 1 times diameter 11 of optical fiber 7. Other thicknesses may be used in other exemplary embodiments. Spacing, or thickness 37 is chosen to provide the appropriate thickness 29 of top portion 27.

An aspect of the invention is a maximum footprint area of the epoxy 15/diffusion retarding plate 17 arrangement, given the size restrictions brought about by other components (not shown) on substrate surface 5. As such, it is an aspect of the invention to maximize lateral width 31 of lateral portions 25. Lateral width 31 may be determined in part by the proximity of other components in the optical package. In an exemplary embodiment, lateral width 31 may be about 10 to 20 times as great as diameter 11 of optical fiber 7, but other lateral widths may be used in other exemplary embodiments.

An aspect of the present invention is that saturation rate of epoxy 15 is significantly reduced because there is less moisture absorption in epoxy 15 as diffusion retarding plate 17 prevents the absorption of water from water vapor-containing air by epoxy 15 through its top surface. The only significant mechanism for moisture absorption by epoxy 15 is through lateral absorption of water through sidewalls 35 and 45. With water absorption by epoxy 15 reduced, then the diffusion rate of water within epoxy is similarly reduced. Since length 21 far exceeds width 23, the relevant diffusion mechanism for saturation considerations, is the lateral diffusion of water molecules along the direction of lateral width 31. Lateral width 31 is chosen to provide a significantly lengthy diffusion path so that the saturation of epoxy 15 by diffusion of absorbed water, is obviated or at least severely restricted. Because of the comparatively long diffusion path in the lateral direction compared to the distance between the optical fiber and the environment in traditional arrangements, epoxy 15 is extremely saturation-resistant. The reduction in the water diffusion rate within epoxy 15 can be explained according to the following. For a first order approximation, the gradient of water concentration within the epoxy can be expressed as follows:

$$\frac{dC_w}{dx} = \frac{C_{wo} - C_{wi}}{x_o - x_i}$$

where
$C_{wo}$—average water concentration outside the epoxy
$C_{wi}$—average water concentration inside the epoxy
$x_o$—distance coordinate corresponding $C_{wo}$
$x_i$—distance coordinate corresponding to $C_{wi}$ When compared to a conventional epoxy bonding scheme in which the diffusion path is less and for a given (initial) average water concentration inside the epoxy, the gradient of water concentration is reduced according to the arrangement of the present invention because the distance increment $x_o$–$x_i$ is greater. The quantity $x_o$–$x_i$ is generally represented by lateral width 31 and may be considerably greater than the conventional spacing between the optical fiber and the environment, e.g., an arrangement of an optical fiber bonded to a substrate with an epoxy and no diffusion retarding plate. The gradient of water concentration in the arrangement of the present invention is much less than one in traditional epoxy fiber bonding schemes and therefore the diffusion rate of water into the epoxy is similarly reduced. According to Fick's Law, the water diffusion rate in a porous medium such as an epoxy can be expressed as follows:

$$n = -D\frac{dC_w}{dx}$$

where
n—water diffusion rate: kg/s
D—diffusion coefficient: $m^2/s$
$dC_w/dx$—gradient of water concentration: $kg/m^2$ As such, the water diffusion rate, n, is proportional to the gradient of water concentration ($dC_w/dx$) and is reduced according to the arrangement of the present invention. The water diffusion rate is reduced, the amount of water absorbed by the epoxy is reduced, and the saturation resistance of the epoxy is therefore increased.

An aspect of the invention is illustrated by conventional 85/85 damp heat testing of the arrangement of the present invention compared to traditional epoxy fiber bonding schemes. According to the 85/85 damp heat testing, the fiber optic package is subjected to conditions of an 85° C. temperature and 85% humidity, and the current produced by a photodetector optically coupled to the optical fiber carrying an optical signal, is measured. Results indicate that in traditional fiber epoxy bonding, failure of the unit begins as current drops significantly after a time ranging from 300 to 800 hours of testing. In comparison, the photodetector current of a photodetector optically coupled to an optical fiber bonded according to the present invention, remains substantially the same, i.e. variations in the photodetector current remain within a 10% margin, for up to 5000 hours. This comparison is intended to be exemplary only and other test techniques and procedures may be used to demonstrate the extended lifetime of the epoxy coupled fiber according to the present invention.

FIG. 3 illustrates another exemplary embodiment of the present invention. In addition to optical fiber 7 being disposed on substrate surface 5, the illustrated embodiment includes diffusion retarding plate 17' including legs 41. Legs 41 extend down to contact substrate surface 5 and substantially laterally surround epoxy 15 and form a boundary with sidewalls 35. Legs 41 may be continuous or discontinuous along the direction perpendicular to the plane of the page of FIG. 3. The illustrated embodiment including diffusion retarding plate 17' offers the additional aspect that lateral diffusion through sidewalls 35 of epoxy 15 is precluded. This substantially increases the saturation resistance of epoxy 15 since the only diffusion path for water to enter epoxy 15 would be through sidewalls 45 and along length 21 of the diffusion plate. Since length 21 may be chosen to be around 1 to 5, preferably 3 to 5 millimeters or greater, water absorption throughout epoxy 15 is further lessened and saturation resistance of epoxy 15 is significantly increased. In this exemplary embodiment, since the lateral diffusion path is less critical, lateral width 31 may be reduced to increase integration levels by accommodating the disposition of additional devices in close proximity to optical fiber 7. Legs 41 may also serve as spacers to ensure that spacing or thickness 37 is as desired by forming a boundary with sidewalls 35.

The preceding embodiments merely illustrate the principles of the invention. It will thus be appreciated that those skilled in the art will be able to devise various arrangements which, although not explicitly described or shown herein, embody the principles of the invention and are included within its scope and spirit. For example, the diffusion retarding plate may take on other shapes as it covers, surrounds or partially surrounds epoxy 15.

Furthermore, all examples and conditional language recited herein are principally intended expressly to be only for pedagogical purposes and to aid in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and the functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of the present invention is embodied by the appended claims and their equivalents.

What is claimed is:

1. A fiber optic package comprising an optical fiber bonded to a substrate surface by an epoxy covered by a diffusion retarding plate formed of a moisture-resistant material, said diffusion retarding plate covering an entire upper surface of said epoxy, wherein said diffusion retarding plate is formed of ceramic or metal, said optical fiber is disposed over said substrate surface and said epoxy surrounds a length of said optical fiber.

2. The fiber optic package as in claim 1, wherein said optical fiber is disposed over said substrate surface and said epoxy includes a top portion formed over said optical fiber and lateral portions formed adjacent each of opposed sides of said optical fiber, said diffusion retarding plate disposed over said top portion and over said lateral portions.

3. The fiber optic package as in claim 2, wherein said lateral portions each include a width being about 10 to 20 times as great as a diameter of said optical fiber.

4. The fiber optic package as in claim 2, in which said optical fiber is disposed on said substrate surface.

5. The fiber optic package as in claim 1, wherein said optical fiber is disposed over said substrate surface and said epoxy includes a top portion formed over said optical fiber and including a thickness ranging from 0.5 to 1 times a diameter of said optical fiber.

6. The fiber optic package as in claim 1, wherein said diffusion retarding plate includes a bottom surface that is substantially conterminous with said epoxy.

7. The fiber optic package as in claim 1, wherein said diffusion retarding plate is substantially planar and parallel to said substrate surface.

8. The fiber optic package as in claim 1, wherein said epoxy is a non-conductive epoxy.

9. The fiber optic package as in claim 1, wherein said fiber optic package comprises an optical subassembly, and said optical fiber, said substrate surface, said epoxy and said diffusion retarding plate form part of said optical subassembly.

10. The fiber optic package as in claim 1, wherein said fiber optic package comprises at least one of a transmitting optical subassembly and a receiver optical subassembly.

11. The fiber optic package as in claim 1, wherein said diffusion retarding plate further includes opposed legs that contact said substrate surface.

12. The fiber optic package as in claim 1, wherein said epoxy is bounded superjacently by an upper portion of said diffusion retarding plate, and at least part of said epoxy is bounded laterally by said legs of said diffusion retarding plate.

13. An optical subassembly comprising an epoxy formed over a substrate surface, a diffusion retarding plate formed over said epoxy, and an optical fiber disposed between said diffusion retarding plate and said substrate surface, said diffusion retarding plate including legs that laterally bound said epoxy.

14. The optical subassembly as in claim 13, wherein said optical fiber extends through said epoxy.

15. A non-hermetic fiber optic package comprising an optical fiber joined to a substrate by an epoxy that is at least partially separated from air by a moisture-resistant member, wherein said moisture resistant member comprises a cover that substantially directly surrounds said epoxy superjacently and laterally.

16. A method for forming a non-hermetic fiber optic package, comprising:

providing an optical subassembly including a substrate and an optical fiber;

joining said optical fiber to said substrate with an epoxy; and covering an entire top surface of said epoxy with a diffusion retarding plate, said diffusion retarding plate formed of a moisture-resistant material, wherein said diffusion retarding plate further includes legs and said covering includes positioning said legs to bound opposed sides of said epoxy.

17. The method as in claim 16, wherein said covering comprises disposing said diffusion retarding plate directly on said epoxy.

18. The method as in claim 16, wherein said joining includes surrounding a circumferential portion of said optical fiber with said epoxy.

19. The method as in claim 16, wherein said joining and covering comprise positioning an optical fiber over a surface of said substrate and covering said optical fiber with said epoxy.

20. The method as in claim 16, wherein said joining comprises forming said epoxy over and adjacent said optical fiber, said epoxy therefore including adjacent sections, and said covering includes covering said adjacent sections with said diffusion retarding plate.

21. The method as in claim 16, wherein said joining comprises fixing said optical fiber in position using a first portion of said epoxy then adding a second portion of said epoxy, said first portion comprising a UV epoxy and said second portion comprising a thermal epoxy.

22. A fiber optic package comprising an optical fiber bonded to a substrate surface by an epoxy covered by a diffusion retarding plate formed of a moisture-resistant material, said diffusion retarding plate covering an entire upper surface of said epoxy, in which said optical fiber is disposed on said substrate surface.

* * * * *

UNITED STATES PATENT AND TRADEMARK OFFICE
CERTIFICATE OF CORRECTION

PATENT NO. : 7,083,335 B2 Page 1 of 1
APPLICATION NO. : 10/662595
DATED : August 1, 2006
INVENTOR(S) : Miao et al.

It is certified that error appears in the above-identified patent and that said Letters Patent is hereby corrected as shown below:

In the Claims

Column 7, line 27, Claim 12    Delete "claim 1"
                               Insert --claim 11--

Signed and Sealed this

Twentieth Day of March, 2007

JON W. DUDAS
*Director of the United States Patent and Trademark Office*